United States Patent Office 2,977,465
Patented Mar. 28, 1961

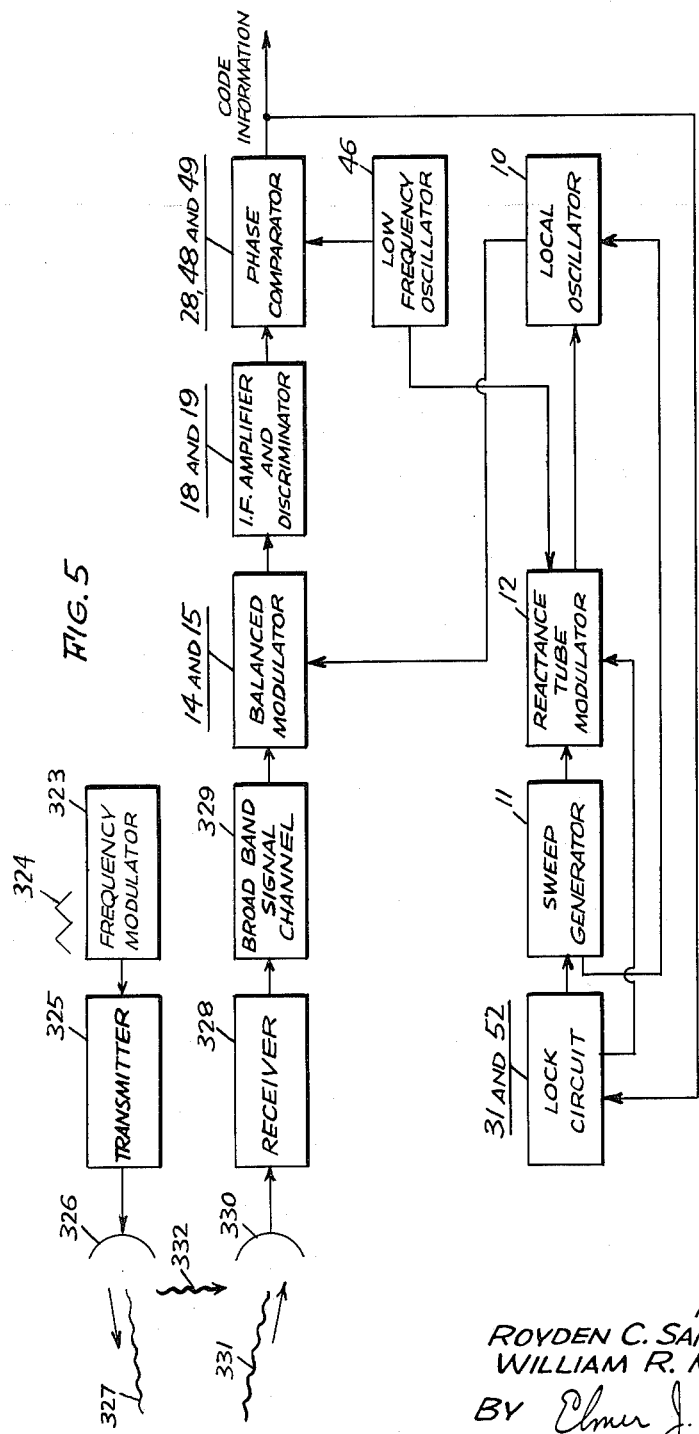

2,977,465

FREQUENCY-SCANNING RADIO RECEIVERS

Royden C. Sanders, Jr., Nashua, N.H., and William R. Mercer, Belmont, Mass., assignors to Raytheon Company, a corporation of Delaware Filed Dec. 24, 1956, Ser. No. 630,722

22 Claims. (Cl. 250—20)

This is a continuation-in-part of an application, Serial No. 561,376, filed January 24, 1956, now abandoned, of Royden C. Sanders, Jr. and William R. Mercer, which, in turn, is a continuation-in-part of application, Serial No. 232,604, filed June 20, 1951, now abandoned.

This invention relates in general to radio receiving systems which examine a region in the spectrum of radio-frequency electromagnetic wave energy to determine the presence therein of signal energy at one or more particular frequencies. More particularly, the invention relates to a system which is able to discriminate a low-energy signal from a noise background and automatically lock itself in tune with the first such signal which is discovered.

The desirability of being able to detect a weak radio signal in the presence of substantial noise is readily appreciated. Among existing equipments addressed to this problem are radio receivers which scan a given band of frequencies, or spectral range, taking as it were a "panoramic" view, and indicate the result of each scanning excursion on the face of a cathode ray tube. An intelligent operator, viewing the information presented, can often discriminate a signal from the background noise, sometimes even when the noise is greater in amplitude than the signal. However, there are situations which require the use of automatic equipment which cannot bring the flexibilities of human intelligence into the process of signal detection, and it is to these situations that the present invention is particularly addressed.

In general, the system according to the invention includes a spectrum analyzer which repetitiously scans a spectral range of frequencies and presents narrow increments, or bands, thereof continuously to a discriminator through a very narrow band filter, which can simultaneously be an amplifier. If, during this process, there is presented to the discriminator a burst of wave energy which is even momentarily of greater amplitude than the general noise level, the discriminator provides a corresponding pulse which is effective to interrupt the scanning action of the spectrum analyzer. The circuit through which this interruption is effected is conveniently called a "locking circuit," and causes the receiver system thereafter to remain tuned to the frequency at which the burst occurred. As a refinement, continued presence in the discriminator of burst energy at this frequency is effective, through discriminator action, automatically to adjust the tuning of the system to the frequency of the burst energy. The locking circuit is effective also to bring into operative effect a component system which then examines the energy which is present in the discriminator to determine whether it is merely random noise, or a true signal. This can be done in many ways, and only a single preferred component system is illustrated in connection with the embodiment of the invention which will presently be described. After burst energy is found to include signal energy, this information is presented to utilization devices. If, on the other hand, the burst energy is found to consist merely of random noise, the system resumes scanning substantially at the frequency at which it was interrupted, and pauses again upon encountering another outstanding burst of energy. A further refinement which is incorporated in a presented system is a circuit which automatically adjusts the ability of the system to distinguish between outstanding bursts and general noise in accordance with the frequency at which bursts occur, thereby making the system extremely sensitive to any outstanding burst, and providing that every such burst shall be examined for the possible presence of signal energy. The foregoing actions all occur automatically and with great speed, and the system does not in any way rely upon human judgment once it is set into operation.

Further advantages and features of the invention will become apparent from the detailed description of an embodiment thereof which follows. This description refers to the accompanying drawings wherein:

Fig. 5 illustrates the application of the invention to a radar system.

Figure 1:
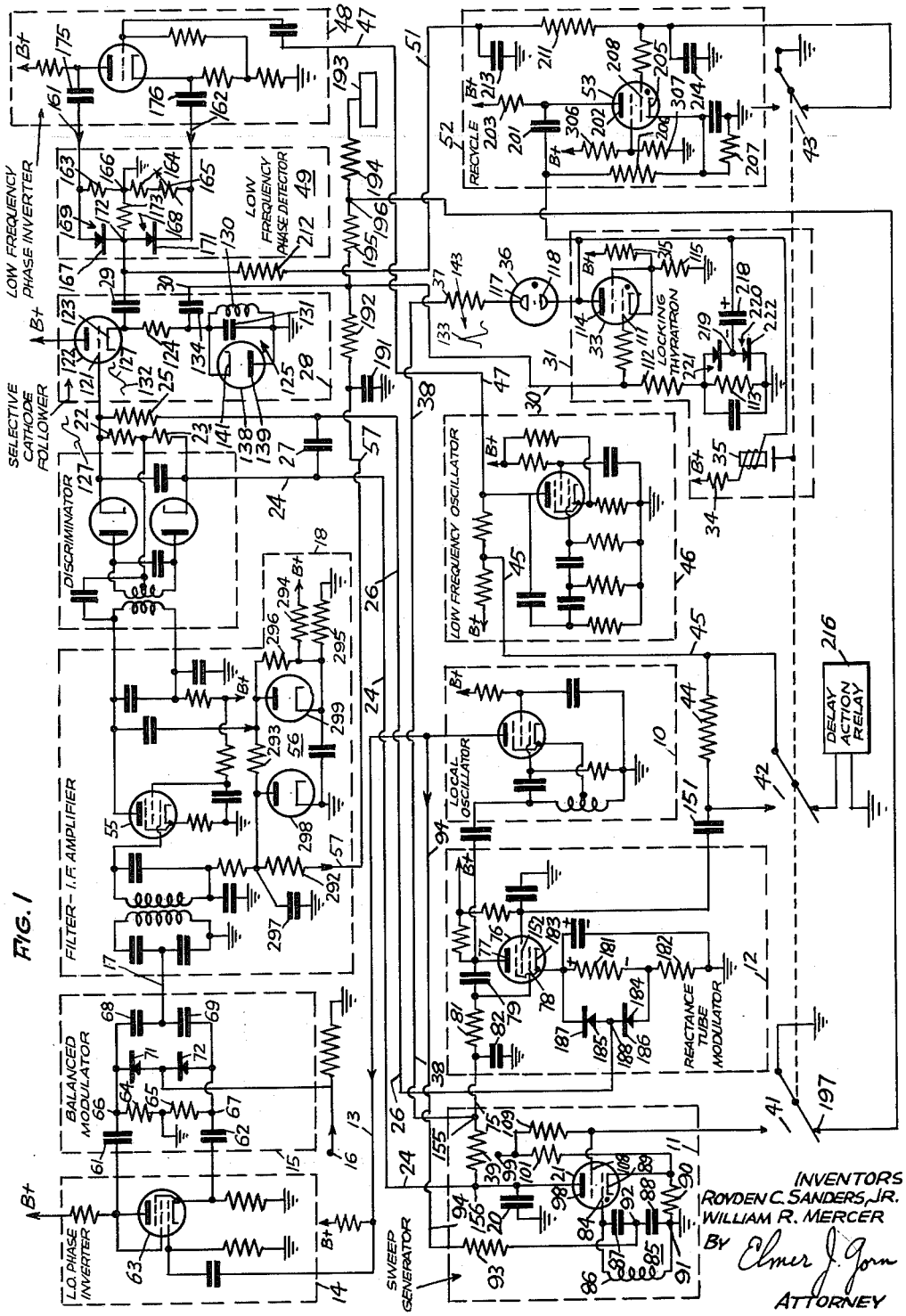
Fig. 1 is a circuit diagram illustrating a preferred manner of practicing the invention.

Referring now to Fig. 1, a local oscillator 10, which may be of any convenient form and is here illustrated as a Hartley oscillator, is caused to sweep in frequency by a sweep voltage generator 11 through the medium of a reactance-tube circuit 12. The sweep voltage generator furnishes a saw-tooth voltage wave by charging a capacitor 20 in a relaxation oscillator circuit, including a gaseous discharge tube 21, for example, a thyratron, in a manner well known to the art. The frequency-varying output of the oscillator 10 is brought over a line 13 to a phase inverter 14, and thence to a balanced modulator 15 of a kind which suppresses the local-oscillator voltage in its output, as will presently be explained. The radio waves which are being examined are brought to the balanced modulator 15 through an input terminal 16. The output of the balanced modulator is brought over a single line 17 to a narrow band filter 18 which is in the form of an I.F. amplifier. As the local-oscillator frequency sweeps through a given range of frequencies, successive portions of the radio-frequency spectrum present at the input 16 are enabled to pass through the filter 18 by heterodyne action, and are presented to a discriminator 19, which is here illustrated as one of the Foster-Seeley type. The output of the discriminator appears across the load resistors 22 and 23, and one end (lower end in Fig. 1) of resistor 23 is connected directly via line 24 to the charging capacitor 20 in the sweep generator. The free end (upper end in Fig. 1) of resistor 22 is connected through a resistor 25 and a line 26 to the reactance tube circuit 12 in a manner presently to be explained. A filter capacitor 27 is connected across lines 24 and 26. Lines 24 and 26 provide, as will be explained (in connection with Fig. 4), an automatic frequency-control circuit, and the resistor 25 and capacitor 27 in these lines insure stability in this circuit.

The free, or upper, end of the discriminator output resistor 22 is connected also to a selective cathode-follower circuit 28 which has two output lines 29 and 30. Output line 30 is employed when a burst of energy is discovered in the spectrum being examined, and over this line a control signal is applied to a locking thyratron circuit 31 which functions to stop the sweep generator 11 from continuing to sweep, and to maintain the capacitor 20 charged at whatever potential existed at the time of stopping. Line 29 is employed during the examination of the energy which is then present in the discriminator output to determine whether or not a true signal is present, and this will presently be explained in detail.

The locking thyratron circuit 31 comprises a thyratron tube 33 to which anode potential is brought from a source of, for example, 300 volts via an anode circuit resistor 34 and the operating coil 35 of a relay in series. The charging current for the sweep-generator capacitor 20 is furnished over this resistor 34 and coil 35 through a gaseous tube 36, for example, a neon tube, and resistor 37 of high value, for example, about two megohms, in series and a line 38. A further somewhat smaller resistor 39 is also included between line 38 and the capacitor 20, and the purpose of this last-mentioned resistor will be subsequently explained. As will presently appear, the gaseous tube 36 serves to isolate the capacitor 20 when the thyratron 33 is fired, so that the capacitor remains charged to the extent it was charged at the instant of such firing.

The operating coil 35 controls a plurality of switches 41, 42 and 43 which are all ganged. Each of these switches is illustrated in the position which it would occupy with the operating coil 35 de-energized. The coil is energized when the thyratron 33 is fired, and each switch changes position. Considering for the moment switch 42, this switch then provides a short circuit across a resistor 44 which is connected in series in an output line 45 from a low-frequency oscillator 46 to the reactance-tube circuit 12. The low-frequency oscillator, which may have a frequency of, for example, seventy cycles per second, is then employed to frequency modulate the local oscillator 10 through the reactance tube 12, and this, in turn, causes frequency modulation of whatever energy is present in the filter 18. The low-frequency oscillator which has been illustrated will be recognized as an oscillator of the phase-shift type which is well known to the art. A second output line 47 runs from the low-frequency oscillator to a phase inverter 48, and thence to a phase detector 49. The output line 29 from the selective cathode-follower circuit 28, which is used to determine whether or not a true signal is present, is also connected to the phase detector 49. As will presently appear, if a true signal is present in the discriminator at the time the locking thyratron circuit 31 causes sweeping to stop, then a unidirectional signal having a prescribed sense will appear in line 51 and be applied to a recycle circuit 52.

The recycle circuit 52 includes another gaseous discharge tube 53, also preferably a thyratron, and is designed so that normally the tube 53 becomes conductive within a prescribed interval after the thyratron tube 33 of the locking thyratron circuit 31 has become conductive, and has the effect, when becoming conductive, of cutting off the locking thyratron tube 33, thereby causing the sweep generator 11 to resume sweeping. However, the presence in line 51 of a suitable signal prevents the recycle circuit 52 from accomplishing this mission, and, as we will see, such a suitable signal is present only when the receiver has become locked on a true signal, rather than random noise.

Of the component parts of the receiver, which are illustrated in Fig. 1, many are well known. The local oscillator 10, the discriminator 19, and the low-frequency oscillator 46 have already been identified and will be readily recognized. In the filter 18, there is illustrated a single stage 55 of an I.F. amplifier of well-known form, having connections for A.V.C. 56. Obviously, two or more stages of I.F. amplification could be employed if desired. The A.V.C. voltage is applied over line 57 to line 30, which is the signal input line for the locking thyratron circuit 31, and this in connection with a bias circuit formed by voltage divider resistors 315 and 115 assists in establishing the threshold of operation of the locking thyratron tube 33 at a suitable value.

The balanced modulator 15 is provided with push-pull input from the local oscillator 10 via the phase inverter 14 and input capacitors 61 and 62. The input voltage appears across two series-connected resistors 64 and 65, which are connected between the input capacitors. The phase inverter 14 is of well-known form and includes a pentode-type electron tube 63. The local-oscillator voltage may be regarded as a reference voltage, and is substantially balanced to ground for the range of frequencies through which the local oscillator 10 is operated. The reactances of the capacitors 61 and 62 are substantially equal throughout this range of frequencies, and approximately equal in magnitude to one-half the total resistance of resistors 64 and 65. These resistors 64 and 65 are equal, and their common junction is grounded. Thus, the voltages at the extreme points 66 and 67 of resistors 64 and 65, due to the local oscillator 10, are substantially equal in magnitude and out-of-phase. The reactances of two output capacitors 68 and 69, which are series-connected between the points 66 and 67, are likewise made substantially equal to each other for the frequency range of the local oscillator 10. The output line is taken from the common junction of the two output capacitors. The voltage at the frequency of the local oscillator, appearing in the output line 17 of the balanced modulator, is substantially zero in magnitude.

The energy which is brought into the balanced modulator over the input terminal 16 has a frequency in a range, or spectrum, which differs from that of the local oscillator by the frequency to which the I.F. amplifier is set, for example, 150 kilocycles. The arrival of a signal voltage via the input terminal 16 causes the impedance-to-ground at points 66 and 67 to be changed in in accordance with the amplitude and polarity of the signal voltage, the impedance increasing at point 66 and decreasing at point 67, or vice versa. The modulation products in the output line 17 will then be the frequencies $f_2$, $(f_1 \pm f_2)$, $(n_1 f_1 \pm n_2 f_2)$, etc., where: $f_1$ and $f_2$ are, respectively, instantaneous frequencies of the local oscillator 10 and the input energy via terminal 16, and $n_1$ and $n_2$ are higher harmonics of $f_1$ and $f_2$, respectively. The unidirectional conductors 71 and 72 may be standard crystal diodes, which are also well known.

The sweep generator circuit 11 controls the reactance-tube circuit 12 by applying the potential existing across the charging capacitor 20 to the reactance tube circuit over line 75 through the resistor 39 in the charging circuit. The reactance tube circuit includes a pentode-type electron tube 76, the anode 77 of which is coupled back to the control grid 78 through the phase-shifting capacitor 79. Line 75 is connected to the control grid 78 through a resistor 81, and a capacitor 82, which may be, for example, 0.001 microfarad, is connected from line 75 to ground. During the time when the capacitor 20 is being charged (through resistor 34, coil 35, gas tube 36, very large resistor 37, and resistor 39), the charging current flowing through the last-mentioned resistor 39 produces a voltage drop which has the effect of maintaining the grid 78 of the reactance tube at a potential which is more positive than the potential existing across the charging capacitor 20. This has an effect, which will be discussed in detail below, which is employed at the time when the receiver locks to adjust the frequency of the local oscillator 10 in a sense which improves the accuracy of the system.

In systems of the present kind, it is desirable that the frequency-scanning means be stable as to scanning frequency, and to this end the present sweep-generating circuit 11 includes sweep-limiting means in the circuit of the control grid 84 of the tube 21 thereof. Thus, a tuned circuit 85, having in parallel an inductor 86 and the branch including two capacitors 87 and 88 in series with each other, is connected between the control grid 84 and the cathode 89 of the sweep-generator tube 21. A resistor 90 intervenes between the cathode and the tuned circuit 85, and the junction 91 of these two is then grounded. The junction 92 of the two capacitors 87 and 88 of the tuned circuit 85 is connected through a resistor 93 and line 94 to the output of the local oscillator 10.

Figure 2:
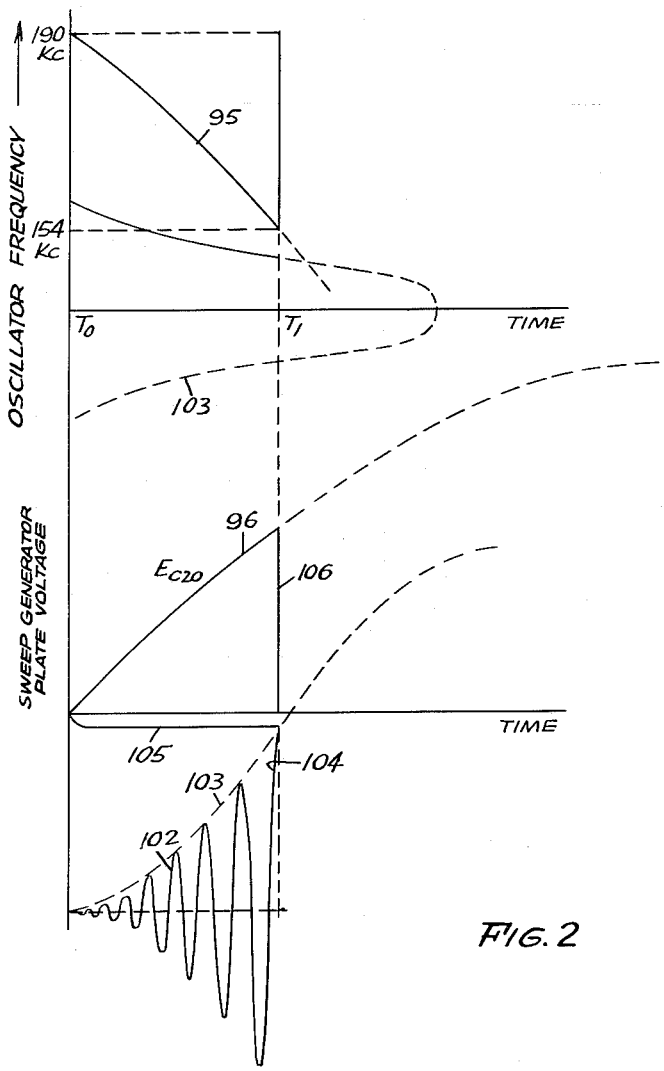
Fig. 2 is a set of graphs illustrating the operation of one component part of Fig. 1.

The tuned circuit 85 is sharply resonant to the extreme frequency to which the local oscillator 10 is swept by the sweep-generator circuit 11. Thus, in a particular instance, the local oscillator 10 is swept from a frequency of 190 kilocycles per second when the capacitor 20 is substantially uncharged to an extreme frequency of 154 kilocycles per second. This is illustrated in Fig. 2, where curve 95 illustrates the change in frequency of the local oscillator 10 with time, and curve 96 illustrates the voltage across capacitor 20 during the corresponding interval of time. The constants of the sweep-generator circuit 11 are so chosen that the charging capacitor 20 must arrive at a potential much higher than that which is needed to bring the local oscillator 10 to the extreme of 154 kilocycles per second, in order for the anode 98 of the tube 21 to arrive at a potential which will cause the tube 21 to fire. This is done in order that a relatively linear portion only of the normal capacitor-charging curve 96 will be used in the spectrum-analyzing function, and it is accomplished by placing the cathode 89 at a static potential which is positive with respect to that of the control grid 84. Thus, a source of positive voltage for example about 230 volts, is applied via terminal 99 through resistor 101 to the cathode 89. Resistor 101 is then in series with resistor 90 in a path from the terminal 99 to ground, while the control grid 84 is connected to ground through the inductor 86, which has a very low resistance. The sweep-generator tube 21 is then fired by the output of the local oscillator 10. As the frequency of the local oscillator 10, changing toward 154 kilocycles per second, becomes the same as that to which the tuned circuit 85 is resonant, alternating voltage waves 102 (see Fig. 2), which are constantly diminishing in frequency, become of increased amplitude in accordance with the resonance curve 103, shown in dotted line in Fig. 2, until an oscillation 104 sharply breaks through the critical grid-potential curve 105 for the sweep-generator tube 21, and causes the tube to fire. This occurs substantially at a local oscillator frequency of 154 kilocycles per second in the present example. The saw-tooth voltage wave 96 then quickly returns to an initial, or zero, value as illustrated at 106, in a known fashion, at the same time, $T_1$, the frequency of the local oscillator returns substantially instantaneously to a value of 190 kilocycles per second. This type of sweep-limiting circuit for a relaxation oscillator is aptly termed a "Stonewall" circuit.

When the receiver system is first turned on from a cold start, the capacitor 20 starts to charge almost immediately, inasmuch as the positive potential which is furnished via resistor 34 is immediately available. On the other hand, the cathodes of the various electron tubes are, for the most part, indirectly heated, and for this reason the reactance tube 76 and the tube in the local oscillator circuit 10 do not begin to function until the capacitor 20 has received a substantial charge which is far beyond the value which would cause the local oscillator 10 to have a frequency of, in the foregoing example, 154 kilocycles per second. If this should happen, the operation of the system might be erratic, or sweeping might not start at all. To insure that the sweep-generator tube 21 will discharge itself in the event that the capacitor 20 becomes charged beyond the desired potential, the shield electrode 108 of the sweep-generator tube 21 is connected to the terminal 99 through a suitable resistor 109 and, therefore, is furnished with the positive potential which is available at this terminal. This 230 volt positive potential at the shield electrode 108 positively insures that the sweep-generator tube will overcome the approximately 2.3 volt cathode bias established by voltage divider resistors 90 and 101 even in the absence of excitation of the tuned circuit 85 by the local oscillator, such firing of tube 21 occurring after condenser 20 has built up to a voltage somewhat exceeding the 50 volts, which corresponds to the local oscillator frequency which will excite the tuned circuit 85.

It will be appreciated that the sweep-generator tube 21 becomes conductive only during the short moments when it is fired to discharge the charging capacitor 20 at the end of each sweep signal. At other times, this tube is nonconductive. Thus, whenever the receiver system is locked at a particular frequency, the sweep-generator tube 21 is nonconductive. At such times, this tube will introduce noises into the system over line 24, or through line 75, for example, if the shield electrode 108 is permitted to retain the aforementioned high positive potential. For this reason, when the locking thyratron circuit 31 is fired and the relay coil 35 is energized, one of the switches 41 which is controlled by this coil is operated to connect the shield electrode 108 directly to ground, and this removes a possible source of unnecessary noise.

Sweeping of the sweep-generator circuit 11 is controlled by the locking thyratron circuit 31. The tube 33 of this circuit is normally held in a nonconductive state by a fixed negative bias produced by resistors 115 and 315 connected between an approximately 215 volt B+ potential and ground. Control signals for this tube are applied to the control grid 111 thereof via line 30, and these signals appear as a voltage across resistors 112 and 113. Any signal which has sufficient magnitude in the positive direction with respect to ground will fire the locking thyratron tube 33, thereby substantially reducing the anode 114 thereof to near ground voltage. Considering now the gas tube 36, this may be, as has already been mentioned, simply a neon tube having two similar electrodes 117 and 118. The ignition voltage of such a tube is approximately eighty-five volts while the extinction voltage is approximately fifty-five volts. When the system is first turned on, the required ignition voltage is easily provided by the source which is connected to the resistor 34, which source may provide approximately 300 volts B+ potential, and the tube 36 fires and provides a path to the charging capacitor 20. The charging capacitor is charged to a voltage of from twenty to fifty volts in normal operation, and is always discharged at the same level, which is about fifty volts. When the locking thyratron tube 33 is fired, the anode 114 thereof assumes a potential which is in the neighborhood of thirty volts, and accordingly the voltage across the neon tube 36 is much less than fifty-five volts, so that this tube is extinguished. Thereafter, the capacitor 20 is completely isolated from any possible discharge path, except through the cathode circuit of the discriminator tube 76, as will be explained in connection with Fig. 4. With this arrangement, when the receiver system of the invention is locked at a particular frequency, it is maintained very stably tuned to a signal existing at that frequency. The receiver is caused to continue sweeping through the established frequency range by cutting off the locking thyratron tube 33, which has the effect of reigniting the neon tube 36, and the manner in which the locking thyratron tube is cut off to do this will be presently explained.

Considering now the selective cathode-follower circuit 28, the input voltage which is applied to this circuit appears across the load resistors 22 and 23 in the output of the discriminator 19. The signal which is applied to the selective cathode-follower circuit is of a fluctuating nature, and for this reason the input circuit path is completed at one end via line 24 through the charging capacitor 20 of the sweep-generator circuit to ground. The charging capacitor 20 is quite large, having a value of approximately one microfarad, so that for alternating frequencies it has substantially no impedance. The other side of the input path includes the control grid 121 of the selective cathode-follower tube 122 and is completed through the cathode 123, resistor 124, and the tuned circuit 125 in series to ground. The voltage which appears at the control grid 121 therefore includes the saw-tooth voltage wave 126 (Fig. 3) which exists across the charging capacitor 20, as well as the output of the discriminator 19, whatever that may be at any particular instant.

As the local oscillator 10 is swept through the established frequency range, the existence of a signal in the filter 18 will manifest itself in the discriminator output by causing the voltage across resistors 22 and 23 to execute a reversal in polarity between two extremes, or peaks, so that a voltage wave 127, having the appearance of a single approximately-sinusoidal oscillation, is superimposed upon the saw-tooth voltage wave 126 at the instant when the signal occurs, and this, of course, is determined by the then-existing frequency of the local oscillator 10. The wave 127 which has the appearance approximating that of a single sinusoidal wave is the familiar S curve of a Foster-Seeley discriminator, and will hereafter be referred to as the S curve. This is well known to the art, and appears in a discussion in Article 26, chapter IV, pages 4–80 to 4–83, of the textbook entitled "Principles of Radar," M.I.T. Radar School Staff, published by McGraw-Hill Book Company, Inc., New York 1946, as well as in Patent No. 2,121,103.

Figure 3:
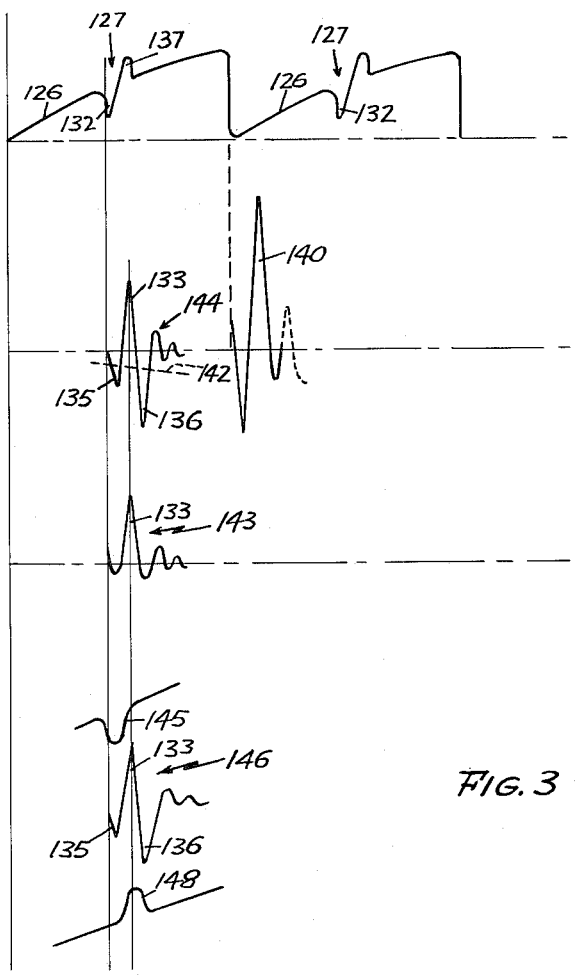
Fig. 3 is a set of graphs illustrating the operation of another component part of Fig. 1.

The S curve 127 appears also at the cathode 123 and across resistor 124 and the tuned circuit 125, inasmuch as the voltage at the cathode 123 essentially duplicates that at the control grid 121 with, perhaps, a slight diminution in magnitude. The tuned circuit 125 comprises an inductor 130 and a capacitor 131 in parallel. The inductor is one of a high Q and has a D.C. resistance of approximately 4000 ohms, as compared with about 115,000 ohms for the resistor 124. During the slowly-changing saw-tooth voltage wave, very little inductive reactance appears across the inductor 130. However, upon the occurrence of a sudden change in direction of the current flowing through the inductor 130 when the negative-going half 132 of the S curve 127 occurs, a sharp voltage wave 133 of spike-like form appears across the inductor 130. The inductor 130 is so connected that the spike 133 is positive with respect to ground in line 30, to which the spike is coupled via coupling capacitor 134. The spike 133 is delayed with respect to the peak of the negative-going half 132 of the S curve, as is illustrated in Fig. 3, this delay being due to the reactance of the inductor 130.

Upon examining the wave form which exists across the inductor 130 with an oscilloscope, it has been found that, just prior to the occurrence of the spike 133, the voltage across the inductor 130 begins to fall in phase with the negative-going half 132 of the S curve 127, as is illustrated at 135. This is thought to be due to the 4000 ohms resistance of the inductor 130, and, of course, the voltage change due to resistance would be in phase with the voltage of the source. Following the positive spike 133, a negative spike 136 occurs, and this appears to correspond with the positive-going half 137 of the S curve 127.

A diode 138 is connected across the inductor 130 with its anode 139 at ground and its cathode 141 connected to the junction with the cathode resistor 124. This has the effect of cutting off the extreme peaks of the portions 135 and 136 of the voltage across the inductor 130 below a region illustrated by the dotted line 142. The actual voltage wave present in the input line 30 to the locking thyratron circuit 31 is, therefore, approximately as illustrated at 143. This is a positive voltage of sufficient magnitude to fire the locking thyratron tube 33 and interrupt the sweeping of the sweep generator 11. Without the diode 138, the tuned circuit 135 continues to oscillate, or ring, after it is shock-excited, as is illustrated at 144. The diode substantially damps out such oscillations. It has been found that the diode 138 also discriminates strongly against the pulse 140 and associated disturbances which tend to arise in the tuned circuit 125 when it is shock-excited upon sudden discharge of the charging capacitor 20 at the end of a sweep cycle, so that this pulse does not cause an unnecessary lock of the receiver.

The selective cathode-follower circuit has the unique ability to distinguish between S curves 127 of mutually opposite apparent phase. That is, when the negative-going half 132 of the S curve precedes the positive-going half 137 in time, the output of the selective cathode-follower circuit 28 will yield the positive spike 133 as desired, whereas when the positive-going half of the S curve 127 precedes the negative-going half in time, the positive spike 133 will be, for all practical purposes, absent. This has been verified experimentally by a process which will now be set forth.

The discriminator was first mistuned, so that, upon sweeping a sinusoidal signal of known frequency through it, the output was in the form of a negative-going wave 145 only (Fig. 3). This wave yielded an oscillatory voltage across the inductor 130 having the form illustrated at 146, in the absence of the diode 138. The wave at 146, it will be seen, includes the spike 133 and the initial negative-going portion 135, as well as a negative spike 136. The amplitude of the wave illustrated at 146 was, however, somewhat less than that of the wave across the inductor 130, which appeared when the discriminator was correctly tuned to provide the S curve 127. The discriminator was then mistuned in the opposite direction to provide under the same operating circumstances an output having a single positive-going wave 148, and, when this was done, it was found that there was practically no voltage across the inductor 130 in response to sweeping the same known sinusoidal voltage through the discriminator.

This startling difference is employed in the present system to distinguish between discriminator outputs in the form of an S curve 127, having what may be termed "mutually opposite phase." A burst of noise, as distinguished from a true signal having a coherent form, can conceivably yield an S curve which ranges all the way from smooth, as though a true signal were present, to ragged and practically unidentifiable, and will not necessarily require that the negative-going portion shall precede the positive-going portion. A true signal, on the other hand, since it has a coherent characteristic, such as an established frequency, will always require that the negative-going portion of the S curve shall precede the positive-going portion, or vice versa, depending upon the particular design of the spectrum-analyzing equipment. In the present instance, it is desired that the negative-going portion of the S curve shall precede the positive-going portion thereof in the presence of a true signal. Thus, there is a large degree of discrimination against mere noise, as distinguished from a true signal, by virtue of the character or nature of the selective cathode-follower circuit. This is an initial rejection of noise, but, as will be seen, the present receiver system includes also apparatus which precisely determines whether the signal which is accepted by the cathode-follower circuit and caused to lock the receiver in tune at a particular frequency is itself a true signal, or also mere noise, in which latter event the recycle circuit 52 is permitted to cause the receiver system to resume scanning.

When the receiver is locked by a burst of energy which produces an S curve output of the proper apparent phase from the discriminator 19, the signal, if one is present, is at some position along the saw-tooth 126, depending upon its frequency in the spectrum under analysis, as has already appeared in connection with Fig. 3, and further, the signal is stopped somewhere along the S curve 127.

As has already been set forth, the locking thyratron tube 33 becomes conductive, and the relay coil 35 closes its switch 42 to shunt the resistor 44 in the output line 45 of the low-frequency oscillator 46. The low-frequency oscillation voltage which is available in the line 45 is coupled via capacitor 151 to the screen grid 152 of the reactance tube 76. In this manner, when the resistor 44 is short-circuited, the low-frequency oscillator voltage is caused to frequency modulate the output of the local oscillator 10 at the rate of the low-frequency oscillator. A suitable frequency for this is, for example, seventy cycles per second. The input signal which may then exist in the balanced modulator 15 is accordingly frequency modulated at the low-frequency rate, seventy cycles per second. After the discriminator signal passes through the discriminator, the modulation frequency is recovered and employed to determine the nature of the energy in the discriminator in a manner which will presently be explained. The frequency-modulation excursions are limited in range, and it is desired that the output of the discriminator shall, during such frequency modulation, remain along that portion of the S curve which is intermediate the positive-and-negative-going peaks, that is, centered in the S curve. The delay which occurs in locking, due, as has been explained, at least in part to the delay in the inductor 130 of the selective cathode-follower circuit, permits the saw-tooth voltage 126 to grow, however, to a value which may be somewhat too great, so that the signal, if one is present, is near the positive-going peak 137 of the S curve 127. The amount of this unwanted shift from center will vary with the position along the saw-tooth wave 126, since the latter is not perfectly linear. In order to compensate for this, the resistor 39 is included in common in the charging circuit of the charging capacitor 20 and the control circuit of the reactance-tube modulator 12.

During the time when the capacitor 20 is charging, charging current flows in this resistor 39, so that the end 155 thereof, nearer to the input line 75 of the reactance-tube modulator, is more positive than the end 156, which is joined to the charging capacitor 20. In this manner, the local-oscillator frequency is maintained displaced from the frequency which it would have in the absence of the resistor 39, in accordance with the difference in potential in the positive direction between the ends 155 and 156 of this resistor. When the system is locked and sweeping stops, current stops flowing to the capacitor 20, and the voltage across the resistor 39 immediately vanishes, so that the voltage at point 155 becomes the same as the voltage across the capacitor 20. In other words, a step-wise reduction in voltage is impressed upon the control grid 78 of the reactance tube 76, and this alters the local-oscillator frequency in a sense to compensate for the delay in the inductor 130 and center the signal, should a true signal exist, in the proper region in the S curve 127. With this arrangement, a frequency-modulation examination of the signal which is possibly present can be carried out with the low-frequency oscillator 46 and the apparatus which is now to be described.

As has already been set forth, the low-frequency oscillator 46 has two output lines 45 and 47, the former of which is employed to frequency modulate the local oscillator 10 through the reactance tube 76 when the resistor 44 therein is short-circuited by a switch 42. The latter output 47 of the low-frequency oscillator is the input line to the low-frequency phase inverter 48 which provides signals of corresponding frequency and like amplitude, but opposite phase to the low-frequency detector 49 over connections 161 and 162.

The low-frequency phase detector 49 comprises a first branch having a first resistor 163, a second resistor 164, and a third variable resistor 165 in series. The junction 166 of the first and second resistors 163 and 164 is grounded. A second branch of the phase detector comprises a first diode rectifier 167 and a second diode rectifier 168 in series, the two branches being connected in parallel with each other. The anode 169 of the first rectifier is connected to input line 161, and the cathode 171 of the second rectifier is connected to input line 162 of the phase detector. The cathode and anode of the first and second rectifiers 167 and 168, respectively, are connected together to a junction 172 to which the output line 29 of the cathode-follower circuit 28 is also connected. An output resistor 173 is connected between the junctions 166 and 172 of the two parallel branches.

When the resistance of the first resistor 163 is equal to the combined resistances of resistors 164 and 165, the average current in the output resistor 173 is substantially zero. This is due to the fact that a low-frequency voltage of one phase in line 162 will cause a given amount of current to flow in one direction in the output resistor 173 via the second diode rectifier 168, while a simultaneously-existing low-frequency signal of similar amplitude and opposite phase in the other input line 161 will cause a similar current to flow in the opposite direction in the output resistor 173 via the first diode rectifier 167. To this end, the diode rectifiers 167 and 168 have similar forward and reverse characteristics, and the coupling capacitors 175 and 176 from the phase inverter 48 have similar impedance characteristics at the frequency of the low-frequency oscillator 46. By varying the variable resistor 165, it is possible to provide that a direct current voltage will exist across the output resistor 173, which in the absence of a true signal will have a predetermined polarity and magnitude. As will be presently explained, in the present system such a voltage is provided across the output resistor 173, and this voltage may furnish a control bias for the recycle tube 53.

The frequency modulation which is applied to the local oscillator 10 is recovered in the discriminator 19 in the same form as it was furnished by the low-frequency oscillator 46 if a true signal is present in the receiver input. A fixed phase relation exists between this recovered signal and the signals which are provided to the low-frequency phase detector 49, and, by suitable design provisions around the loop, including the reactance-tube circuit 12, the local oscillator 10, the local-oscillator phase inverter 14, the balanced modulator 15, the filter-I.F. amplifier 18, and the discriminator 19, this phase relation may be made to be zero with respect to the signal in one of the input lines 161 or 162, and 180 degrees with respect to the signal in the other of these input lines. Accordingly, when a signal of the low-frequency oscillator frequency appears in the output line 29 of the cathode-follower circuit 28, one of the diode rectifiers 167 and 168 conducts more current than the other over a complete cycle, and a voltage having a corresponding polarity appears in the output resistor 173. This voltage can have any desired polarity and magnitude, and in the present instance the phase relations are so designed that the voltage developed by a signal will be negative at junction 172 with respect to junction 166 which is ground.

It will be appreciated that, because of the presence of an amplifier 18 in the circuit of the low-frequency signal which appears from the cathode-follower circuit 28, the magnitude of this signal can easily be adjusted with respect to those which appear from the phase inverter 48. Thus, if the phase of the amplified signal is properly chosen, during the half-cycle when the anode 169 of the first diode rectifier 167 is being driven in the negative-going direction, the cathode of the same rectifier can be driven in the same direction to the same extent, so that this rectifier remains nonconductive, while simultaneously the anode of the second rectifier 168 is driven in the negative-going direction during the time when its cathode 171 is driven in the positive-going direction, and the second rectifier, too, remains nonconductive. During the succeeding half-cycle, under these conditions, the anode 169 of the first rectifier is driven in the positive direction, while the cathode thereof is likewise driven in the positive-going direction in the same extent, so that during this half-cycle also the first rectifier 169 remains nonconductive. However, at the same time, the anode of the second diode rectifier 168 will be driven in the positive-going direction, while the cathode 171 thereof is driven in the negative-going direction, so that the second rectifier 168 becomes conductive. Thus, it is seen that, due to the presence of properly phased energy from the low-frequency oscillator, the low-frequency phase detector is caused to have a voltage across the output resistor 173 of a particular polarity. It is seen, also, that, by varying the phase of the low-frequency signal from the cathode-follower circuit 28, the polarity of the resulting voltage across the output resistor 173 can be chosen at will.

The utility of the foregoing signal-testing circuits flows from the fact that randon noise is characterized by its lack of a phase spectrum, although it may have a definite power spectrum on the average. Thus, if a narrow band of random noise is selected, for example, by the spectrum analyzer which has been described, from a much broader band of random noise, its amplitude will ordinarily depend upon the portion of the broad band selected. In particular, if the portion selected is varied with time, as it is in the present invention, a synchronous amplitude may result. Also, time-varying gain of an amplifier passing the random noise may cause it to exhibit amplitude modulation. On the other hand, whether a fixed, or time-varying, portion of the original noise is selected, the phase spectrum of the narrow-band noise remains equally random, that, is it nonexistent on the average. It is not possible to remove this randomness of phase by any specified time-varying transmission phase characteristic.

The following explanation is given relating to random noise. The frequency modulation deviation to be applied to the signal or energy in the balanced mixer does not exceed the narrow inspection increment passed by the intermediate frequency amplifier. When a coherent signal is in the narrow inspection increment of the spectrum, it is modulated to produce this low deviation FM signal. This low deviation FM signal is demodulated to produce a 70 cycle component which is passed into the phase detector to produce a direct current control signal. However, when only noise occurs in the inspection increment of said spectrum (small as opposed to the entire band) the demodulated noise in this narrow increment contains only a small percentage of the total frequency modulated energy entering the entire balanced mixer spectrum. For example, each component of noise entering the balanced mixer is modulated in the same manner as the coherent signal to produce a separate spectrum for each noise component. However, since there are many noise components, the spectrums overlap each other. Inasmuch as the phase of the sidebands of a frequency modulated signal are asymmetrical, that is, positive and negative, it follows that when the many noise spectrums overlap, individual FM sidebands substantially cancel. Therefore, the 70 cycle component output from the narrow inspection increment for noise is substantially negligible upon demodulation. While, instantaneously, there is a small amount of 70 cycle energy passed through the inspection increment by noise, when averaged over the short detection interval, that is, a few cycles at the 70 cycle rate, the detected portion of the 70 cycles resulting from the noise will be substantially zero.

In contrast to random noise, a genuine, or true, signal exhibits definite coherence, or self-correlation, of its phase. This is particularly true in a radar system, where the present invention, as shown in Fig. 5, may be used for the purpose of searching for radar echo signals having random frequencies depending upon the Doppler effect. It is true in general, also, of communication systems, where the same coherence, or self-correlation of a genuine signal exists, as contrasted with the utter lack of phase coherence of random noise. The essence of the signal-testing system, which has just been described, resides in the employment of the phase-coherence properties of a true signal, as contrasted with the lack of coherence, or incoherence properties, of random noise to distinguish the true signal from a mixture of signal and noise.

The signal presented to the balanced modulator 15 over the input terminal 16 consists of random noise, and may include one or more true signals. Assuming that the portion of the total input energy which is selected by the filter 18 contains a true signal plus any energy such as noise in the surrounding frequency region equal to the bandwidth of the filter, the low-frequency oscillator 46 is applied to all of this energy. The difference frequency signal produced with the true signal which is present in the balanced modulator 15 and presented to the filter 18 is frequency modulated synchronously with the local oscillator 10 and with the same deviation, which is small. However, because of the random phase properties of the noise which is converted with the signal, the noise appears substantially the same in the filter, whether the local oscillator 10 is frequency modulated or not. After the total signal from the filter has passed through the discriminator 19, the true signal appears as one of the same frequency as that of the low-frequency oscillator 46, and, as has been set forth, of definite relative phase with respect thereto. If a lock has occurred on a mere random noise peak or spike, so that actually no true signal is present, the frequency modulation of the local oscillator 10 will have no measurable effect upon the output of the discriminator 19. On the other hand, if a true signal exists, it is then phase detected in the low-frequency phase detector 49, as has been set forth, and is recognized here as a unidirectional voltage of appropriate polarity.

Figure 4:
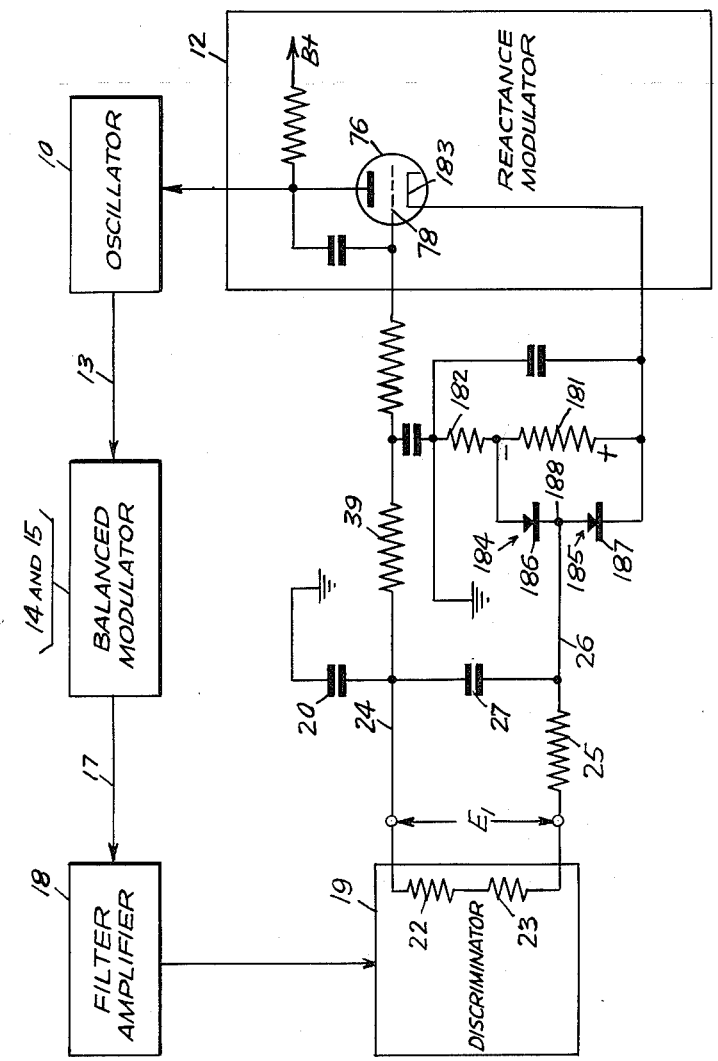
Fig. 4 is a block diagram including some circuit elements illustrating the operation of the automatic frequency control employed in Fig. 1.

During the time when the receiver system is locked at a particular frequency, it is carefully controlled by an automatic frequency-control means, shown in Fig. 1 and illustrated in particular in Fig. 4. The output of the discriminator 19 appears across the load resistors 22 and 23, and in Fig. 4, this output is labeled $E_1$. When a signal is centered in the discriminator, $E_1$ is substantially zero, or at least very small in magnitude. At the time of lock, it is desired that the potential existing across the charging capacitor 20 should be maintained static in order to keep the transconductance of the reactance tube 76 from varying, and thereby altering the frequency of the local oscillator 10. The exception to this requirement is that the transconductance of the reactance tube is desirably varied to an extent sufficient to keep the signal centered in the discriminator when the signal itself drifts in frequency. The potential across the charging capacitor 20 is, in the present embodiment, at some potential between twenty and fifty volts when a lock occurs, and, as will be seen more readily from Fig. 4, the leakage path through which the charge of this capacitor can be changed is through the discriminator output resistors 22 and 23, the filter resistor 25, the cathode circuit of the reactance tube 76 and ground. The cathode circuit of the reactance tube will now be explained.

The reactance-tube circuit 12 employed in the present embodiment includes a pair of resistors 181 and 182 connected in series between the cathode 183 of the reactance tube 76 and ground. Since the reactance tube is normally always conductive, current continuously flows in these two resistors, and a voltage always exists across each of these resistors due to this current. The first resistor 181 may have a value of, for example, 6800 ohms, while the second resistor 182 may be 12,000 ohms. A pair of diode rectifiers 184 and 185 are connected in series across the first resistor 181, and are poled with their cathodes 186 and 187, respectively, toward the cathode 183. Thus, these rectifiers are biased in the nonconductive direction by the voltage existing across the first resistor 181 due to the current through the reactance tube 76. The particular diodes employed are crystal diodes having the characteristic that their resistance is approximately one hundred times greater in the nonconductive condition than in the conductive condition. Accordingly, with both diodes 184 and 185 having resistances which are substantially equal to each other in the nonconductive condition, the point 188, at which the line 26 from the discriminator is joined to the junction of these two diodes, is substantially at the same potential with respect to ground as the mid point of the first resistor 181. It is toward the potential of this point that the voltage across the sweep capacitor 20 tends in absence of some controlling influence when the receiver system is in the locked condition. The potential of point 188 is desirably chosen midway in the sweep-voltage range of the capacitor 20, as this minimizes the rate of drift on the average when lock occurs.

The time constant of the path through which the sweep, or charging capacitor 20 can be discharged is governed by the diodes 184 and 185. When these are in the nonconductive condition, and their resistance is high, then the time constant is a long one. Thus, even in the absence of a true signal in the discriminator 19, the potential across the sweep capacitor 20 will change very slowly toward the potential of the junction point 188 between the two diodes 184 and 185. If a true signal is present in the discriminator, this drifting will be compensated by the appearance of a voltage $E_1$ of suitable polarity and magnitude which will alter the reactance of the reactance-tube circuit 76 through the grid 78 thereof, so that the signal will remain centered in the discriminator. As has already been mentioned, the resistor 25 and capacitor 27 are for the well-known purpose of preventing hunting in the closed loop, including the reactance-tube modulator 12, the local oscillator 10, the balanced modulator 15, the filter 18 and the discriminator 19.

In the event that a radical shift occurs in the signal frequency, or for some other reason a signal which was present in the discriminator is shifted a great distance along the S curve of the discriminator, the voltage $E_1$ will assume a correspondingly large magnitude and appropriate polarity. The magnitude will be large enough to cause one or the other of the diodes 184 and 185 to become conductive, and thereby lower its resistance by a factor of approximately one hundred. This will materially reduce the time constant of the circuit through which the sweep capacitor 20 can be changed, and hence a fast automatic frequency-control action (A.F.C.) results. Thus, there is afforded an antidrift A.F.C. circuit which provides a long time constant in the A.F.C. loop in the absence of a discriminator error voltage, and a much shorter time constant in the A.F.C. loop in the presence of a discriminator error voltage which exceeds a predetermined level. The predetermined level is, of course, that level which is required to render one or the other of the diode rectifiers 184 and 185 electrically conductive.

The Miller effect in the reactance-tube circuit effectively multiplies the size of the capacitor 20 for A.F.C. purposes and, consequently, provides the long time constant required for loop stability.

It will be recalled that the sweep capacitor 20 has a large value, for example, one microfarad. A capacitor of this size, in connection with the aforementioned Miller effect, is sufficiently large to furnish a bypass to ground for signals of low frequencies, even those of the low-frequency oscillator 46, so that the low-frequency oscillator signal which appears in the discriminator 19 during the signal-testing operation of the present receiver system does not get into the A.F.C. loop, but only into the cathode-follower circuit 28. Only the unidirectional current component is for all practical purposes appreciated in the A.F.C. loop.

Referring again to the locking thyratron circuit 31, the tube 33 of this circuit may be a thyratron type 2D21. In the present circuit, this tube has a potential at the anode 114 of approximately 300 volts in the cut-off condition, while the control grid 111 is at about −4.5 to −5.0 volts as established by the aforementioned voltage divider resistors 115 and 315 which provide a positive bias on the cathode and a corresponding negative bias on grid 111. The control grid has also a negative unidirectional potential furnished from the A.V.C. 56 of the filter I.F. amplifier 18 over line 57. The A.V.C. voltage is thus employed to provide a bias component which is proportional to the changes in average noise amplitude during sweeping, for the noise which is encountered in a particular application will vary at different places in the spectrum. The time constant of this circuit is governed mainly by the capacitor 191, connected between the A.V.C. line 57 and ground, and the resistor 192 in series with this line and the control grid 111 of the locking thyratron tube 33. A fairly long time constant is desired, in order that the voltage from the low-frequency oscillator 46 will not have any effect upon the A.V.C. circuit.

An additional bias is furnished to the control grid 111 from a source 193 of negative voltage, for example about −30 volts, which is connected to the grid input line 30 of the locking thyratron circuit 31 via two relatively large resistors 194 and 195 in series. The junction 196 of these two resistors is connected to the normally-closed terminal 197 of the switch 41 which is employed during lock to ground the shield 108 of the sweep-generator tube 21. Thus, during lock, the junction 196 is lifted from ground, and the negative voltage of the source 193 is furnished to the control grid 111 of the locking thyratron tube 33 through resistors 194, 195, 112 and 113 in series. To prevent the −30 volts negative bias from adversely affecting the A.V.C. circuit 56, bleeder bias resistors 294 and 295 connected between a positive voltage B+ and ground provide a positive voltage of approximately +40 volts to one end of the one megohm resistors 296 and 293 connected in series to the anode of detector diode 298 and to the .08 microfarad A.V.C. capacitor 297. In absense of a signal from the I.F. amplifier this voltage acts to pull the A.V.C. voltage up toward zero bias and in connection with isolation resistor 292, and limiter diode 299, insures proper A.V.C. operation as well as preventing the −30 volts negative bias 193 from degrading the I.F. amplifier A.V.C. The utility of this bias is to counteract the effect of positive ions which arrive at the control grid 111 when the locking thyratron tube 33 is in a conductive state. Such positive ions are due to the gas which is present in the tube, and are able to charge the filter capacitor 191 of the A.V.C. line and a shunting capacitor 199 in the locking thyratron circuit 31 in such a sense as to maintain a positive charge on the control grid. Obviously, under this condition the locking thyratron would remain locked, or would lock spuriously, and for this reason the source 193 is of such a magnitude that it counteracts the effect of positive ions arriving at the grid 111.

When the locking thyratron tube 33 is in a cut-off condition, a coupling capacitor 201, which is connected between the anode 114 of the locking thyratron tube and the anode 202 of the recycle tube 53, has a potential of about 300 volts on one side, that of the locking-thyratron anode 114, and a potential of about 215 volts on that of the recycle-tube anode 202. Thus, a potential difference of about 85 volts exists across this capacitor. When the locking thyratron tube 33 is fired, the anode 114 thereof drops to a potential of about +20 volts with respect to ground, and consequently, the divider voltage bias of 2.9 volts provided by resistors 206 and 207 drops by a ratio of approximately 10 to 1, which arms tube 53 to fire at an anode voltage somewhat lower than 215 volts. Additionally, the side of the coupling capacitor 201, which is connected to the recycle-tube anode 202, instantaneously drops to a voltage of about −65 volts with respect to ground. Immediately the coupling capacitor 201 begins to charge, current flowing from the recycle-tube anode source through the anode resistor 203, the coupling capacitor 201, the now-conductive locking thyratron tube 33, the cathode resistor 115 thereof, and ground. The side of the coupling capacitor 201, which is connected to the recycle-tube anode 202, is charged toward a potential of +215 volts, while the other side of this capacitor remains at a potential of +20 volts approximately, so that the ultimate voltage across the coupling capacitor is about 195 volts. The time constant of the charging circuit is determined mainly by the recycle-tube anode resistor 203 which is, for example, 2.2 megohms, and the coupling capacitor 201 which has a value of, for example, 0.05 microfarad. This time constant is approximately 0.11 second, and this is the time required for the side of the coupling capacitor which is connected to the recycle-tube anode 202 to alter its potential 63 percent of the difference between −65 volts and +215 volts, or 63 percent of 280 volts. That is, in approximately 0.11 second the anode 202 of the recycle tube 53 will have arrived at a voltage of about 110 volts.

Considering now the recycle tube circuit 52, the cathode 205 of the recycle tube 53, before tube 33 fires, is maintained at a potential of about +2.9 volts with respect to ground by the resistor network, consisting of resistors 206 and 207 connected in series between the anode 114 of the locking thyratron tube 33 and ground. These resistors have values of approximately 1.5 megohms and 15,000 ohms, respectively. Thus the control grid 208 of the recycle tube 53 is effectively at a bias of −2.9 volts. The recycle tube 53 is also a thyratron, for example, a type 2D21, and this requires an anode voltage of above +215 volts at this grid bias of 2.9 volts in order that the tube will fire. However, after tube 33 has fired, the cathode bias developed by the voltage divider resistors 206 and 207 drops from −2.9 volts to approximately −0.3 volt, and the grid voltage is approximately zero as determined by adjustment of resistor 165 in the low frequency phase detector circuit. The shield grid voltage produced by the 100-to-1 ratio voltage dividing resistors 306 and 307 connected to a +215 volt potential is normally approximately +2.2 volts. Thus, tube 53 will fire at approximately +165 volts unless it is prevented from doing so by a negative-going signal forming in the low-frequency phase detector and biasing grid 208 back to a more negative bias than the −0.3 volt with respect to cathode before condenser 201 charges to approximately +165 volts with respect to ground. Thus, it is apparent that more than one-tenth of a second is required after the locking thyratron tube 33 is fired before the recycle tube 53 can be fired in any event.

Control of the firing of the recycle tube is determined by the variable resistor 165 in the low-frequency phase detector 49. This resistor is a sensitivity control for the recycle circuit 52. It will be seen that the control grid 208 of the recycle tube is connected via resistors 211 and 212 in line 51 to the junction 172 at one end of the load resistor 173 of the low-frequency phase detector 49. Thus the voltage which exists across the load resistor 173 of this phase detector is able to control the recycle tube 53, although in absence of a true signal, the voltage appearing at grid 208 is normally adjusted by means of this sensitive control resistor 165 to be subtsantially zero or slightly positive with respect to ground except for a small A.C. noise voltage. As has previously been pointed out, this voltage is designed to be negative with respect to ground when a true signal is present in the discriminator 19. The voltage across this load resistor in the absence of a true signal can also be made to have such a sense that the junction 172 to which line 51 is joined is either positive or negative with respect to ground, and this is done by varying the magnitude of the variable resistor 165, as has already been pointed out. The utility for this will now be explained.

The voltage in the load resistor 173 of the phase detector 49, due to noise alone, has random peaks which cannot be predicted. This voltage is applied continuously to the control grid 208 of the recycle tube 53. The resistors 212 and 211 in the line 51 carrying this voltage have sufficiently large values, for example, 4.7 and 1.5 megohms, respectively, so that together bypass capacitors 213 and 214, each having a value of about 0.1 microfarad, provide relatively long time constants and hold the magnitude of the noise voltage appearing at the control grid 208 within one-half volt of a mean value. The variable resistor 165 in the low-frequency phase detector 49 functions as a sensitivity control for the recycle circuit 52 by altering this mean value. The sensitivity control is adjusted, so that, when noise alone is in the discriminator after lock has occurred, the recycle tube 53 will be fired in approximately one second after the locking thyratron tube 33 has been fired. Since noise is of a random nature, no fixed adjustment of this control 165 can be made, and preferably this is an operating adjustment which is varied when variation appears to be necessary. Usually, resistor 165 is set such that the D.C. voltage across resistor 173 is substantially zero with the gain of the I.F. amplifier being designed to produce a noise voltage in the absence of a signal of about 0.5 volt R.M.S. This will result in proper operation of the recycle stage at its given operating voltages. This adjustment will vary with the individual tube 53 that is used and with the age of the tube. Of course, it should be understood that different voltages and resistor values could be used in combination with the 2D21 locking and recycle tubes or other tube types, as long as similar operating conditions are produced.

It will be recalled that the switch 43, which is connected to ground the grid 208 of the recycle tube 53 and to keep condenser 205 discharged during sweeping, is operated to open the ground circuit when a lock occurs. It will be recalled also that the recycle tube cannot be fired for at least one-tenth of a second after a lock occurs, due to lack of a sufficient anode potential. If the recycle tube is not fired within a predetermined time after lock occurs, for example one second, set by the sensitivity-control resistor 165, a further operating device, which may be a time delay relay 216, will be operated. Such devices may take any suitable form and may perform any desired function, such as assuming control of the receiver system, upon the system being satisfied that a true signal has been found. The finding of a true signal provides a negative bias in the load resistor 173 of the low-frequency phase detector 49, which prevents the recycle circuit 52 from being fired within the allotted time.

An additional feature of the present embodiment is an autolock circuit controlling the control grid 111 of the locking thyratron tube 33. A capacitor 218 is connected at one side to the anode 114, and at the other side to the junction 219 between two diode rectifiers 220 and 221 arranged in the same direction in series across the resistor 113. This resistor is one of those across which grid-bias voltages are developed for the locking thyratron tube 33. The capacitor 199, which has been previously mentioned, is also connected across this resistor 113. A common junction of the capacitor 199, resistor 113 and the cathode 222 of diode 220 is grounded.

The capacitor 218 is charged from the 300-volt anode source through the anode resistor 34 and the relay coil 35 through the diode 220, which has its cathode 222 grounded. The side of the capacitor 218 which is connected to the locking-thyratron anode 114, is, accordingly, the positive side. When the locking thyratron tube 33 is fired, this side drops radically in voltage, and the capacitor discharges through the other diode 221, since the side connected to the junction 219 becomes momentarily highly negative with respect to ground. Accordingly, a negative charge is placed upon the side of capacitor 199 which is nearer to the control grid 111, so that the control grid 111 is caused to become more negative with respect to ground. The charge which is thus developed across the capacitor 199 eventually leaks off through the resistor 113, but if a great number of pause locks occurs, this charge builds up and biases the control grid 111 in a negative direction to reduce the number of pause locks. A great number of pause locks can occur only when noise bursts are frequent and true signals are absent, and it is desired that the receiver system shall be able to discriminate against such noise bursts and avoid wasting time examining mere noise. The circuit just described, which has been aptly termed an "auto-lock" circuit, accomplishes this purpose.

Referring now to Fig. 5, the invention is shown applied to a radar system of the C.W. type. As noted, this system is used to measure the relative speed of detected objects by the Doppler principle and, when the transmitter is suitably frequency modulated, to measure their distance. In the system shown in Fig. 5, a transmitter 325, employs a frequency modulator 323 producing a triangular voltage 324, and an antenna 326, directionally to emit a beam 327 of electromagnetic wave energy. A receiver 328 is provided with a broad band signal channel 329, capable of passing any Doppler frequency from approximately 1 kilocycle to 100 kilocycles, and employs a receiver antenna 330 to receive electromagnetic energy 331. The receiver 328 is tuned so that it will receive the energy which is to be Doppler modulated by a reflecting target. A certain amount of frequency modulated transmitted energy 332 continuously finds its way into the receiver antenna 330, so that, by the well-known phenomenon of beating instantaneously transmitted and received energy together, the receiver is able to furnish a difference signal representing relative speed to the broad band signal channel 329. The remaining parts, which are essentially those of the radar system and which have been previously described in detail, include the balanced modulator 15, in which the output of the broad band signal channel 329 of the receiver 328 is mixed with the signal of the local or reference oscillator 10 which is swept in frequency by the low-frequency oscillator 46 through the reactance-tube modulator 12. In this manner, the electromagnetic energy present in the broad band signal channel 329 is frequency-scanned and simultaneously reduced to an I.F. frequency suitable to pass the narrow band I.F. channel 18. When a true signal enters the phase capacitor 49 from the I.F. channel 18, the lock circuit 31 interrupts the operation of the sweep generator and causes the sweeping to stop, as previously described.

As is well known, radar apparatus employing the foregoing components further employs suitable means to display the relative speed indicated by a detected signal or code information in accordance with the condition of the sweep generator, or other means for scanning the reference oscillator at the time when a signal is detected. The present invention, however, is directed to the problem of determining when a time signal actually does exist.

Those skilled in the art will recognize that the embodiment of the invention which has been illustrated and described herein includes many features which can be varied, or modified, without resort to invention. For example, the function of signal testing is, in the present embodiment, performed by an arrangement which frequency modulates the energy present in the discriminator. Other arrangements may be employed for this purpose, for example one or the other of the arrangements which are described in the copending applications of Martin R. Richmond, Serial No. 203,875, filed January 2, 1951 and Serial No. 208,141, filed January 27, 1951. Likewise, automatic frequency control and stabilization of the sweep generator may be afforded by means other than those which have been herein illustrated and described. No attempt has been made herein to exhaust all possibilities, and indeed such are practically limitless. It is accordingly intended that the claims which follow shall not be limited by the particular details of the foregoing described embodiment, but rather by the prior art.

What is claimed is:

1. A radio receiver system of the panoramic receiver type having a swept oscillator adapted to sweep at a substantially linear rate over a predetermined frequency range, means providing limitation of the frequency range of said swept oscillator to at least at one end of said frequency range, said means providing limitation including a resonant circuit tuned to a frequency closely adjacent to a predetermined desired limiting frequency, means for feeding the output from said swept oscillator to said resonant circuit, a control circuit fed from said resonant circuit, and means responsive to said control circuit for controlling the frequency of said swept oscillator whereby when said swept oscillator approaches said limiting frequency it is prevented from passing said limiting frequency.

2. A radio receiver system of the panoramic receiver type having a swept oscillator adapted to sweep over a predetermined frequency range, means providing limitation of the frequency range of the swept oscillator including a resonant circuit tuned to a frequency adjacent to a predetermined desired limiting frequency, means for feeding the output of said swept oscillator to said resonant circuit, a control circuit fed from said resonant circuit, and means responsive to said control circuit for controlling the frequency of said oscillator when said swept oscillator approaches said limiting frequency whereby it is prevented from passing said limiting frequency.

3. In a system for searching for radar echo signals having random frequencies, a receiver having a swept oscillator adapted to sweep over a predetermined frequency range, means providing limitation of the frequency range of the swept oscillator at the lower frequency end of said frequency swing including a resonant circuit tuned to a frequency adjacent to a predetermined desired limiting frequency, means for feeding the output of said swept oscillator to said resonant circuit, a control circuit fed from said resonant circuit, and means responsive to said control circuit for controlling the frequency of said oscillator when said swept oscillator approaches the lower limit of said limiting frequency whereby it is prevented from passing said limiting frequency.

4. A signal detecting receiver for scanning a predetermined frequency spectrum having a swept oscillator adapted to sweep over a predetermined frequency range, said swept oscillator including a separate reactance means associated with said oscillator for modulating said oscillator, means providing limitation of the frequency range of the swept oscillator including a resonant tank circuit tuned to the extreme frequency at least at one end of said frequency swing, a control circuit fed by said resonant circuit and connected in circuit with said reactance means, and means responsive to said control circuit for controlling the frequency of said oscillator when said swept oscillator approaches said limiting frequency whereby it is prevented from passing said limiting frequency.

5. In a system for searching for radar echo signals having random frequencies, a receiver comprising means to scan a given radio frequency spectrum, said means including a swept oscillator adapted to sweep over a predetermined frequency range, said swept oscillator including a separate reactance means associated with said oscillator, means providing a limitation of the frequency range of the swept oscillator including a resonant circuit tuned to a frequency adjacent to a predetermined limiting frequency, means for feeding the output of said swept oscillator to said resonant circuit, a control circuit fed from said resonant circuit, and means responsive to said control circuit for controlling the frequency of said oscillator when said swept oscillator approaches said limiting frequency whereby it is prevented from passing through said limiting frequency.

6. In a system for searching for radar echo signals having random frequencies depending upon the Doppler effect, a receiver comprising means to scan a given radio frequency spectrum, said means including a swept oscillator adapted to sweep over a predetermined frequency range, said swept oscillator including separate reactance means associated with said oscillator, means providing limitation of the frequency range of the swept oscillator including a resonant tank circuit tuned to the extreme frequency at least at one end of said frequency swing, a control circuit fed by said resonant circuit and connected to said reactance means, and means responsive to said control circuit for controlling the frequency of said swept oscillator when said oscillator approaches said limiting frequency whereby it is prevented from passing said limiting frequency.

7. A radio receiver comprising frequency-scanning means operative within a given spectrum, a filter having a pass band which is narrow compared to said spectrum, local oscillator means including said frequency-scanning means for converting successive narrow increments of said spectrum to a frequency passable by said filter, signal locking means responsive to a burst of energy in one of said increments having a predetermined level relative to the general noise level in said increment to interrupt the scanning of said frequency-scanning means substantially at the frequency at which said burst occurred, means to frequency modulate said energy in said pass-band set into operation by said interrupting means, means to demodulate said frequency modulated energy, and phase detecting means responsive to said demodulated energy to feed a holding signal to said signal locking means only in response to a coherent signal in the burst of energy present in said narrow increment, said holding signal providing for the resumption of operation of said scanning means when the proportion of signal to noise in said increment is less than a predetermined threshold.

8. A radio receiver comprising frequency-scanning means operative within a given spectrum, a filter having a pass band which is narrow compared to said spectrum, local oscillator means including said frequency-scanning means for converting successive narrow increments of said spectrum to a frequency passable by said filter, signal locking means responsive to a burst of energy in one of said increments having a predetermined level relative to the general noise level in said increment to interrupt the scanning of said frequency-scanning means substantially at the frequency at which said burst occurred, means including a reactance modulator to frequency modulate energy in one of said increments set into operation by said interrupting means, discriminator means to demodulate said frequency modulated energy, phase detection means responsive to a demodulated signal from said one of said increments to provide a voltage to prevent resumption of said scanning means when the proportion of signal to noise in said phase detection means exceeds a predetermined threshold voltage.

9. A radio receiver comprising frequency-scanning means operative within a given spectrum, a filter having a pass band which is narrow compared to said spectrum, heterodyning means including said frequency-scanning means to apply successive narrow increments of said spectrum to said filter means to frequency modulate said energy in said spectrum, demodulation means of the frequency modulating type to provide a demodulated output in response to the position of a signal in said increments, means including a ringing circuit responsive to the rate of change of said demodulated output to interrupt the scanning of said frequency scanning means substantially at the frequency at which the maximum rate of change of said demodulated output occurs, phase detection means set into operation by said interrupting means to produce a control signal in response to the energy present in the narrow increment, means set into operation by said interrupting means adapted to restore said scanning means to a frequency scanning condition at the expiration of a prescribed interval of time, and means responsive to the output of said phase detecting means to prevent actuation of said signal restoring means.

10. A radio receiver comprising frequency-scanning means operative within a given spectrum, said means including a filter having a fixed pass band which is narrow compared to said spectrum and a tunable local oscillator cooperating with said frequency-scanning means to apply a narrow increment of said spectrum to said filter by heterodyne process, a reactance-tube circuit coacting with said local oscillator to frequency modulate the signal in said narrow increment of said spectrum, a relaxation oscillator circuit having a capacitor and the anode-cathode path of a discharge tube in parallel adapted to provide a time-varied voltage to vary the reactance of said reactance-tube circuit with time, said relaxation oscillator adapted to sweep said local oscillator through a predetermined band of frequencies, a source of anode potential for said discharge tube, an interruptible connection between said source and the anode of said discharge tube, switching means responsive to a substantially instantaneous burst of energy in one of said increments having a predetermined intensity relative to the general noise level in said increment to interrupt said connection and leave said capacitor charged substantially to the voltage at which said burst occurred, whereby said local oscillator remains locked to said signal, and additional means including a phase detector to measure the coherence of said signal in said narrow increment of said spectrum as opposed to said instantaneous burst of energy.

11. A radio receiver comprising frequency-scanning means operative within a given spectrum, said means including a filter having a fixed pass band which is narrow compared to said spectrum and a tunable local oscillator adapted to heterodyne a narrow increment of said spectrum to a frequency capable of passing through said filter, a low frequency reference oscillator having a frequency high with respect to the frequency of said frequency-scanning means, a reactance-tube circuit adapted to control the frequency of said local oscillator, a relaxation oscillator circuit having a capacitor and the anode-cathode path of a discharge tube in parallel adapted to provide a time-varied voltage to vary the reactance of said reactance-tube circuit with time, a source of anode potential for said discharge tube, an interruptible connection between said source and the anode of said discharge tube, means responsive to a burst of energy in one of said increments having a predetermined level relative to the general noise level in said increment to interrupt said connection and set into operation said low frequency oscillator to feed a low frequency output signal to said local oscillator whereby said energy in said filter is frequency modulated, said capacitor remaining charged at the voltage existing at the time of interruption, discriminator means to demodulate the frequency modulated energy output of said filter, and phase detection means fed by said discriminator output and said low frequency oscillator to produce a control voltage in response to a coherent signal in the energy present in the increment then passing through said filter.

12. A radio receiver comprising frequency-scanning means operative within a given spectrum, said means including a filter having a fixed pass band which is narrow compared to said spectrum and a tunable local oscillator adapted to cause a narrow increment of said spectrum to pass through said filter by heterodyne process, a low frequency reference oscillator having a frequency high with respect to the frequency of said frequency-scanning means, a reactance-tube circuit adapted to control the frequency of said local oscillator, a relaxation oscillator circuit having a capacitor and the anode-cathode path of a discharge tube in parallel adapted to provide a time-varied voltage to vary the reactance of said reactance-tube circuit with time, a source of anode potential for said discharge tube, an interruptible connection between said source and the anode of said discharge tube, means responsive to a burst of energy in one of said increments having a predetermined intensity relative to the general noise level in said increment to interrupt said connection, said capacitor remaining charged at the voltage existing at the time of interruption, means including said low frequency reference oscillator set into operation by said interrupting means to frequency modulate a true signal in the energy present in the increment then passing through the filter, demodulation means fed by said frequency modulated true signal means set into operation by said interrupting means to restore said connection after a prescribed time interval in the event of loss of a true signal in said filter, and phase detecting means responsive to the output of said demodulation means and the output of said low frequency oscillator to control the operation of said restoring means.

13. A radio receiver comprising frequency-scanning means operative within a given spectrum, a filter having a pass band which is narrow compared to said spectrum, means including said frequency-scanning means to apply successive narrow increments of said spectrum to said filter at a frequency passable by said filter, a discriminator circuit connected at its input to the output of said filter, means connected to the output of said discriminator and responsive to a burst of energy having an intensity greater than the general noise level of said spectrum to interrupt the scanning of said frequency-scanning means substantially at the frequency at which said burst occurred, reference oscillator means set into operation by said interrupting means to frequency modulate the energy in said filter, and phase detecting means fed by the output of said discriminator and by said reference oscillator means to produce a control voltage in response to the presence of a true signal in the output energy of said discriminator.

14. A radio receiver comprising frequency-scanning means operative within a given spectrum, a filter having a pass band which is narrow compared to said spectrum, local oscillator means including said frequency-scanning means to apply successive narrow increments of said spectrum to said filter at a frequency passable by said filter, a discriminator circuit connected at its input to the output of said filter, said discriminator being peaked substantially at the mid-band frequency of said filter and providing a unidirectional output potential which reverses in polarity as said scanning means sweeps through the frequency appropriate for centering therein energy at a particular frequency of said spectrum, a given output side undergoing a total change in voltage during such sweeping which is determined by the amplitude of energy at said particular frequency, a reference oscillator feeding said local oscillator means to frequency modulate energy in said filter, means connected to the output of said discriminator and responsive to a magnitude of said total change greater than that due merely to the general background noise in said spectrum to interrupt the scanning of said frequency-scanning means substantially at the frequency at which said total change attained such greater magnitude, said interrupting means including means also responsive to the sense of the reversal in polarity existing in response of the particular energy in said spectrum which caused said greater magnitude and being operative only when said reversal is in a prescribed direction, and phase detecting means fed by the output of said discriminator and said reference oscillator to produce a control voltage in response to coherent energy passing through said filter.

15. A radio receiver comprising frequency-scanning means operative within a given spectrum, a filter having a pass band which is narrow compared to said spectrum, heterodyne means including said frequency-scanning means to apply successive narrow increments of said spectrum at a frequency capable of passing through said filter, a reference oscillator feeding said heterodyne means to frequency modulate energy in said filter, a discriminator circuit connected at its input to the output of said filter, said discriminator being peaked substantially at the mid-band frequency of said filter and providing a unidirectional output potential which reverses in polarity as said scanning means sweeps through the frequency appropriate for centering therein energy at a particular frequency of said spectrum, a given output side undergoing a total change in voltage during such sweeping which is determined by the amplitude of energy at said particular frequency, means including a ringing circuit responsive to a prescribed rate of reversal of polarity of said discriminator output connected to the output of said discriminator to interrupt the scanning of said frequency-scanning means substantially at the frequency at which said prescribed rate of reversal occurred, and phase detecting means fed by the output of said discriminator and compared with the output of said reference oscillator to produce a control voltage in response to a coherent signal in said filter.

16. A radio receiver comprising frequency-scanning means operative within a given spectrum, a filter having a pass band which is narrow compared to said spectrum, heterodyne means including said frequency-scanning means to apply successive narrow increments of said spectrum at a frequency passable by said filter, demodulating means of the frequency modulation type connected to the output of said filter, a reference oscillator feeding said heterodyne means, a gaseous discharge tube having an anode, a cathode and a control element, said control element being connected in the output of said filter and being biased so that only a burst of energy in one of said increments having a predetermined intensity relative to the general noise level in said increment can render said tube conductive, said tube when conductive being operative to interrupt the scanning of said frequency-scanning means substantially at the frequency at which said burst occurred, means to frequency modulate said energy in said pass band, phase detecting means fed by said reference oscillator and by said demodulating means set into operation when said tube is rendered conductive to produce a control voltage in response to the presence of a coherent signal of predetermined duration in the energy present in the narrow increment, and means controlled by said control voltage to restore said tube to a nonconductive state in the absence of energy of predetermined intensity in said increments, said tube when so restored being operative to restore said scanning means to the frequency-scanning condition substantially at the frequency at which it was interrupted.

17. A radio receiver comprising frequency-scanning means operative within a given spectrum, a filter having a pass band which is narrow compared to said spectrum, local oscillator means including said frequency-scanning means to apply successive narrow increments of said spectrum to said filter, a gaseous discharge tube having an anode, a cathode and a control element, said control element being connected in the output of said filter and being biased so that only a burst of energy in one of said increments having a predetermined intensity relative to the general noise level in said increment can render said tube conductive, said tube when conductive being operative to interrupt the scanning of said frequency-scanning means substantially at the frequency at which said burst occurred, low frequency oscillator means set into operation when said tube is rendered conductive to frequency modulate a signal in the energy present in the narrow increment, demodulating means fed by said frequency modulating signal, phase detecting means fed by said demodulating means to produce a control voltage to restore said tube to a nonconductive state in response to a coherent signal in said increment, said tube when so restored being operative to restore said scanning means to the frequency-scanning condition substantially at the frequency at which it was interrupted, and pause lock means in circuit with said control element to vary the bias thereof in accordance with the frequency of interruption of the scanning of said scanning-frequency means.

18. A radio receiver comprising means to scan a given radio-frequency spectrum, means to pause lock said receiver in tune at any frequency in said spectrum where a burst of energy having an intensity greater than the general noise level of energy in said spectrum occurs, discriminator means to examine only a few cycles in the region of said spectrum to which the receiver is thereby tuned, phase detector means to distinguish a coherent signal from a noise burst, recycling means operative in the absence of a true signal in said phase detector means to cause said receiver to resume scanning, and pause lock means activated by noise bursts in said spectrum to set the threshold of operation of said locking means in accordance with the frequency of pause lock.

19. A radio receiver comprising frequency-scanning means operative within a given spectrum, a discriminator circuit peaked to a predetermined frequency band in said spectrum, means including said frequency-scanning means to apply successive increments of said spectrum to said discriminator circuit, means responsive to energy reception to interrupt the scanning of said frequency-scanning means substantially at the frequency characterizing said energy reception, reference frequency oscillator means set into operation by said interrupting means to frequency modulate any signal in the energy present in the increment, and phase detecting means fed by said reference frequency oscillator means and by said output of said discriminator circuit to produce a control voltage in response to a reference frequency oscillator component passed by a coherent signal in said predetermined frequency band in said spectrum.

20. In combination, a radio receiver comprising discriminator means operative to receive frequency-modulated signals and noise, frequency-scanning means operative within a given spectrum, means including said frequency-scanning means to apply successive narrow increments of said spectrum to said filter and into said discriminator means, means responsive to a burst of energy in one of said increments having a level greater than the general noise level in said increment to interrupt the scanning of said frequency-scanning means substantially at the frequency at which said burst occurred, a low frequency oscillator having a frequency higher than the frequency of said scanning means adapted to produce a frequency spectrum around said input signal which does not exceed said narrow increments, phase detecting means operative in response to signals and noise of a predetermined duration and phase from said discriminator, said phase detecting means provided with a reference voltage from said low frequency oscillator and set into operation by said interrupting means to produce a direct current output proportional to the amplitude of the energy content of a signal at the frequency of said low frequency oscillator in the narrow increment.

21. A system as defined in claim 20, including means coacting with said phase detecting means to restore said scanning means to frequency-scanning condition in the absence of a coherent signal.

22. In combination, a radio receiver comprising a discriminator operative to receive frequency-modulated signals and noise, heterodyne frequency-scanning means operative within a given spectrum, means including said frequency-scanning means to apply successive narrow increments of said spectrum at a frequency passable by said filter, said discriminator being peaked substantially at the mid-band frequency of said filter and providing a unidirectional output potential which reverses in polarity as said scanning means sweeps through the frequency appropriate for centering therein energy at a particular frequency of said spectrum, a given output side undergoing a total change in voltage during such sweeping which is determined by the amplitude of energy at said particular frequency, means including a ringing circuit responsive to a prescribed rate of reversal of polarity of said discriminator output connected to the output of said discriminator, a first gaseous discharge tube having an anode, a cathode and a control element, said cathode provided with a source of bias, said control element connected in the output of said ringing circuit and being biased so that only a burst of energy in one of said increments having an intensity greater than the general noise level in said increment can render said first tube conductive to interrupt the scanning of said frequency-scanning means, a reference oscillator feeding said heterodyne means and set into operation by conduction in said first tube to frequency modulate a signal in one of said increments, a second gaseous discharge tube having an anode, a cathode and a control element, the anode of said second tube connected to the anode of said first tube and a source of voltage, said second tube set into operation after a prescribed time interval in response to conduction in said first tube to restore the scanning of said frequency-scanning means, said control grid of said second tube fed by the output voltage of said phase detecting means to produce a voltage to prevent actuation of said restoring means, said phase detecting means fed by said reference oscillator and the output of said discriminator to produce a control voltage.

References Cited in the file of this patent

UNITED STATES PATENTS

| | | |
|---|---|---|
| 2,283,523 | White | May 19, 1942 |
| 2,486,551 | Boothroyd | Nov. 1, 1949 |
| 2,516,856 | Cowles | Aug. 1, 1950 |
| 2,594,263 | Munster | Apr. 22, 1952 |
| 2,639,372 | Colgan | May 19, 1953 |
| 2,639,373 | Goodrich | May 19, 1953 |
| 2,647,994 | Weiss | Aug. 4, 1953 |
| 2,730,712 | Dawson | Jan. 10, 1956 |
| 2,809,289 | Harris | Oct. 8, 1957 |
| 2,853,601 | McKenna | Sept. 23, 1958 |

FOREIGN PATENTS

| | | |
|---|---|---|
| 528,061 | Great Britain | Oct. 22, 1940 |
| 674,185 | Great Britain | Jan. 18, 1952 |